US 6,901,473 B2

(12) United States Patent
Klissner (10) Patent No.: US 6,901,473 B2
(45) Date of Patent: May 31, 2005

(54) APPARATUS AND METHOD FOR CONFIGURING AN EXTERNAL DEVICE

(75) Inventor: Paul K. Klissner, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 533 days.

(21) Appl. No.: 09/981,137

(22) Filed: Oct. 16, 2001

(65) Prior Publication Data

US 2003/0074512 A1 Apr. 17, 2003

(51) Int. Cl.$^7$ .............................................. G06F 13/00
(52) U.S. Cl. ........................... 710/305; 710/8; 710/104; 713/100
(58) Field of Search ................................ 710/5, 8, 305, 710/63, 104; 709/201, 203, 223, 226; 707/10, 103 R, 1, 100, 102, 104.1; 370/236, 254, 257; 713/100; 463/1; 705/1

(56) References Cited

U.S. PATENT DOCUMENTS

| | | | | |
|---|---|---|---|---|
| 5,838,165 A | * | 11/1998 | Chatter ........................ | 326/38 |
| 5,937,193 A | * | 8/1999 | Evoy .......................... | 717/140 |
| 6,078,968 A | * | 6/2000 | Lo et al. ...................... | 710/5 |
| 6,298,354 B1 | * | 10/2001 | Saulpaugh et al. ..... | 707/103 R |
| 6,359,976 B1 | * | 3/2002 | Kalyanpur et al. ......... | 379/134 |

OTHER PUBLICATIONS

"The VIEW–Station environment: tools and architecture for a platform–independent image–processing workstation" by Sato, H.; Okazaki, H.; Kawai, T.; Yamamoto, H.; Tamura, H. (abstract only).*

"Use of COBRA in the PHENIX distributed online computing system" by Desmond, E.; Adler, S.; Ewell, L.: Haggerty, J; Hyon Joo Kehayias.; Pate, S.; Purschke, M.; Roth, R.; Witzig, C. (abstract only).*

E. M. Maximilien, D. D. Streetman, B. Dimmock, *JAVA™ API for USB(javax.usb)*, *JSR–80 Specification*, Version Code 0.9.0, Apr. 4, 2001, 44 Pages.

* cited by examiner

*Primary Examiner*—Gopal C. Ray
(74) *Attorney, Agent, or Firm*—Martine, Penilla & Gencarella, LLP (57) ABSTRACT

The present invention provides a method and apparatus for configuring an external device. The method comprises receiving configuration information, and providing at least a portion of the configuration information to the external device through a platform-independent interface. The apparatus comprises a storage unit adapted to store a platform-independent routine and a platform-independent interface, and a control unit adapted to execute the platform-independent routine, wherein the platform-independent routine causes the control unit to receive configuration information, and configure a Universal Serial Bus (USB) device through the platform-independent interface using at least the portion of the configuration information.

17 Claims, 5 Drawing Sheets

APPARATUS AND METHOD FOR CONFIGURING AN EXTERNAL DEVICE

BACKGROUND OF THE INVENTION

1. Field of the Invention

This invention relates generally to configuring external devices, and more particularly, to configuring a Universal Serial Bus (USB) device.

2. Description of the Related Art

The universal serial bus (USB) standard is considered by some to be an improvement over traditional serial and parallel ports for connecting peripheral devices to personal computers (PCs). The USB interface may replace a variety of serial and parallel port connectors with one standardized plug and port combination. Furthermore, the USB interface may support plug-and-play (PnP) and hot-swapping capabilities. In other words, with a USB device, a user can readily attach and detach a peripheral device without cumbersome installation and uninstallation procedures (e.g., powering down the computer, opening the computer case to install a card needed for a certain device, rebooting the computer). As a result, PnP may make it simpler for multiplayer game users, business users, and notebook users, for example, to share peripheral devices.

A USB interface may have several advantages over a conventional serial port. For example, a serial port can support a data transfer speed of up to 115 kbps, the USB interface can support up to 12 Mbps. The USB interface may also provide power to its devices, and may support up to 127 devices at one time. Additionally, the USB interface is widely accepted. For example, USB connections are available for a wide range of products including, but not limited to, digital cameras, computer telephony products, speakers, disk drives, printers, mice, keyboards, and the like.

USB devices can be dynamically configured and can contain more than one configuration. However, existing applications to configure USB devices are generally platform-dependent, and thus, separate applications are typically written for each platform. For example, a configuration application written for a UNIX® platform may not execute in a WINDOWS® platform. Accordingly, programmers often write different versions of a configuration application to cover different platforms.

SUMMARY OF THE INVENTION

In one aspect of the present invention, a method is provided for configuring an external device. The method comprises receiving configuration information and providing at least a portion of the configuration information to the external device through a platform-independent interface.

In another aspect of the present invention, an article comprising one or more machine-readable storage media containing instructions is provided for configuring a Universal Serial Bus (USB) device. The one or more instructions, when executed, cause a processor to access a data file, receive data and an associated destination address from the data file, and store the data at a memory location indicated by the destination address in a Universal Serial Bus (USB) device through a platform-independent interface.

In yet another aspect of the present invention, an apparatus is provided for configuring a Universal Serial Bus (USB) device. The apparatus is comprised of a storage unit adapted to store a platform-independent routine and a platform-independent interface, and a control unit adapted to execute the platform-independent routine, wherein the platform-independent routine causes the control unit to receive configuration information, and configure a Universal Serial Bus (USB) device through the platform-independent interface using at least a portion of the configuration information.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As described below, one or more embodiments of the present invention may allow a user to configure a USB device using a routine (hereinafter referred to as a USB configuration routine). The USB configuration routine may be platform-independent, and thus, may be readily transportable from one operating system or processor to another.

Figure 1:
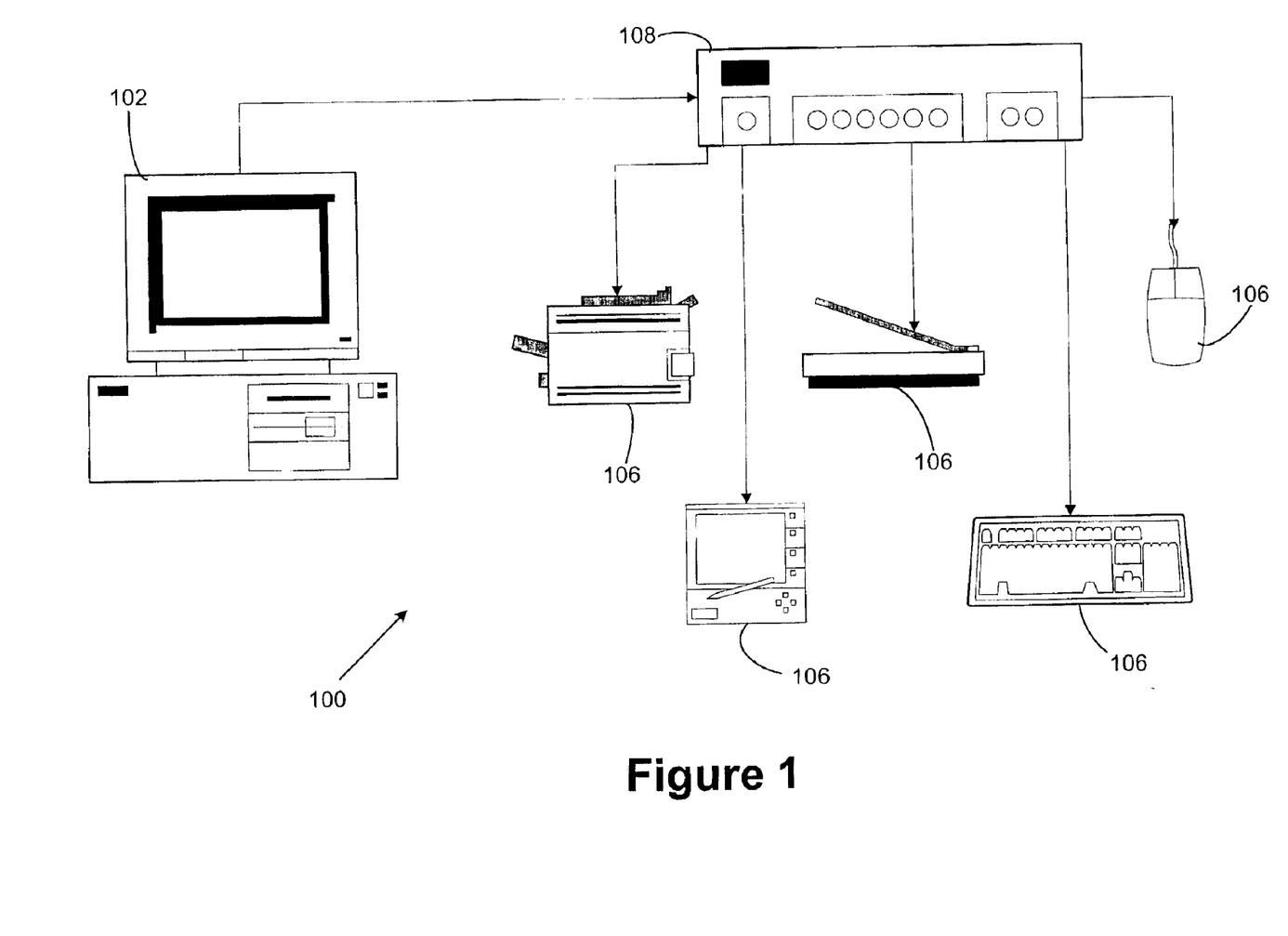
FIG. 1 illustrates a block diagram of a system including a processor-based system coupled to one or more USB devices, in accordance with one embodiment of the present invention.

Turning now to FIG. 1, a system 100 includes a processor-based system 102 that may be adapted to connect to a plurality of USB devices 106 via a USB hub 108. The processor-based system 102 may be one of a variety of devices, such as a personal computer, a cellular phone, a personal digital assistant (PDA), an Internet appliance, or any other device having one or more processors.

Examples of USB devices 106 may include a printer, a PDA, a scanner, a keyboard, a mouse, and any other device capable of supporting a USB connection. In one embodiment, the USB device 106 may contain a CYPRESS® Semiconductor EZ-USB® integrated circuit, such as a CYPRESS® Semiconductor EZ-USB® development board, which may be used to develop and test a prototype USB device 106. The CYPRESS® Semiconductor EZ-USB® integrated circuit may include one or more programmable memories, thereby allowing multiple configurations and upgrades. The programmable memory of the CYPRESS® Semiconductor EZ-USB® integrated circuit may allow a programmer to dynamically test, debug, and upload new code or data to the USB device 106. Similarly, because of the programmable memory on the CYPRESS® Semiconductor EZ-USB® development board, a USB developer may dynamically emulate a variety of USB devices 106.

In one embodiment, the USB hub 108 may be a central device that allows the processor-based system 102 to communicate with a plurality of USB devices 106. In another embodiment, the USB hub 108, as well as the USB devices 106, may be powered by an external source or may draw power from the processor-based system 102.

Figure 2:
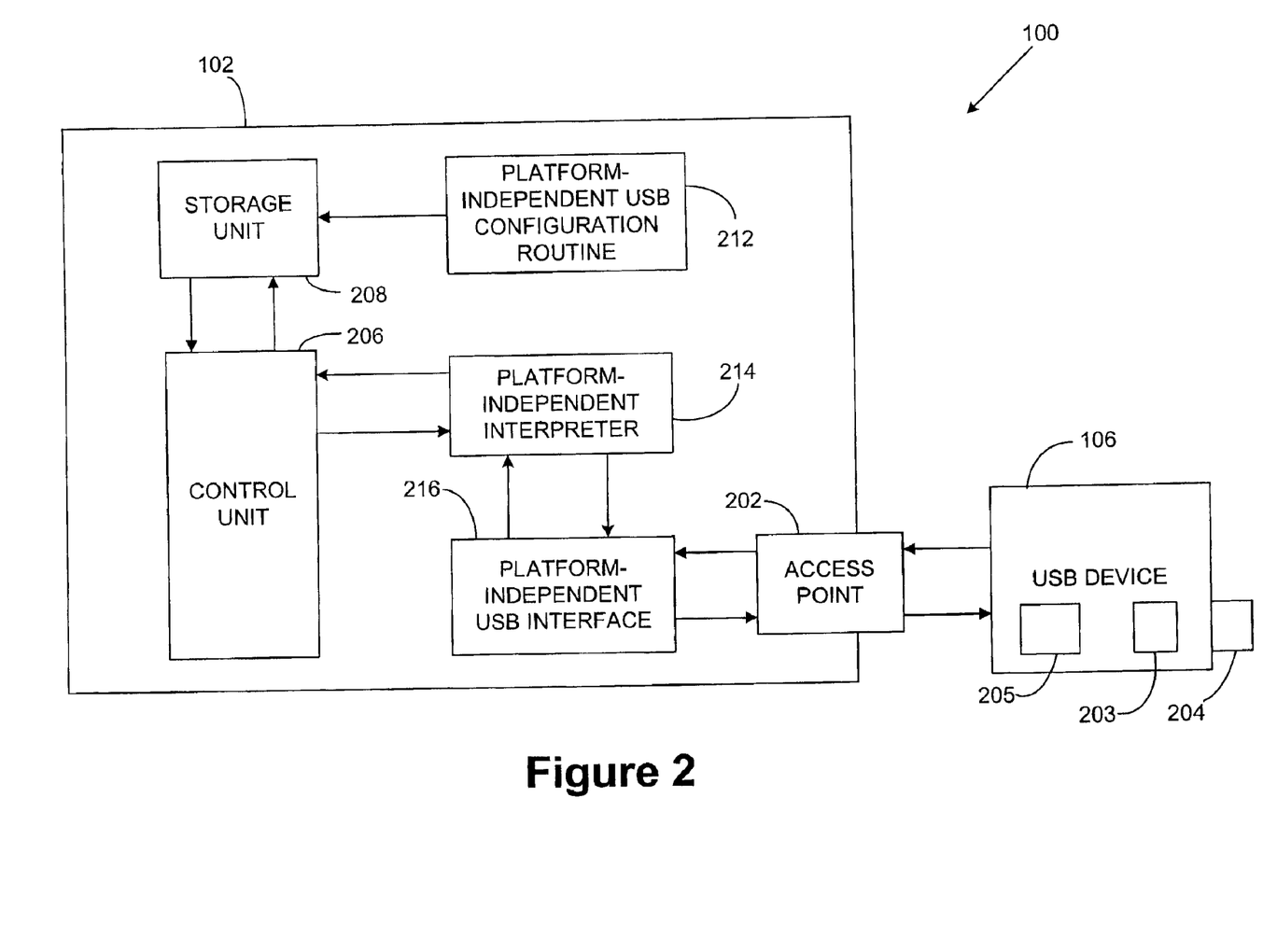
FIG. 2 illustrates a block diagram of one embodiment of the processor-based system coupled to a USB device of FIG. 1.

Turning now to FIG. 2, a block diagram of one embodiment of the system 100 of FIG. 1 is shown. In the illustrated embodiment, the processor-based system 102 is connected to the USB device 106 through an access point 202. In one embodiment, the access point 202 may be a USB root hub that includes one or more USB connectors. The root hub, for example, may be embedded in the processor-based system 102. In an alternative embodiment, the access point 202 may be one of a variety of suitable interfaces that allows the processor-based system 102 to communicate with the USB device 106.

In the illustrated embodiment, the USB device 106 includes an internal memory 203 and an external memory 204, and a control unit 205. In one embodiment, the internal memory 203 may refer to memory residing on a same chip as the control unit 205, and the external memory 204 may refer to memory that is external to memory that is external to the chip of the control unit 205. Furthermore, although the USB device 106 in the illustrated embodiment includes the internal memory 203 and the external memory 204, in an alternative embodiment, the USB device 106 may include more than one internal memory 203 or external memory 204, or any combination thereof. The internal memory 203 and the external memory 204 may take the form of any programmable memory, including dynamic or static random access memories (DRAMs or SRAMs), erasable and programmable read-only memories (EPROMs), electrically erasable and programmable read-only memories (EEPROMs), and the like.

In the illustrated embodiment, the processor-based system 102 includes a control unit 206. The processor-based system 102 may include one or more control units 206. The control unit 205 of the USB device 106 and the control unit 206 of the processor-based system 102 may be a microprocessor, a microcontroller, a digital signal processor, a processor card (including one or more microprocessors or controllers), or other control or computing devices.

The control unit 206, in the illustrated embodiment, is coupled to a storage unit 208. The storage unit 208 may include one or more machine-readable storage media for storing information. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs).

In the illustrated embodiment, the processor-based system 102 includes a platform-independent USB configuration routine 212. In one embodiment, the platform-independent USB configuration routine 212 may be stored in the storage unit 208. In an alternative embodiment, the platform-independent USB configuration routine 212 may be stored in another storage media (not shown), which, for example, may reside within the processor-based system 102 or external to the processor-based system 102.

As described in more detail below, the platform-independent USB configuration routine 212 may comprise one or more executable instructions for configuring the USB device 106. In the illustrated embodiment, the control unit 206 of the processor-based system 102 may execute the platform-independent USB configuration routine 212 using a platform-independent interpreter 214. The platform-independent interpreter 214, for example, may translate the platform-independent USB configuration routine 212 into machine code that is executed by the control unit 206 of the processor-based system 102. Although not so limited, in the illustrated embodiment, the platform-independent interpreter 214 is a Java interpreter. The Java interpreter 214 for the processor-based system 102, for example, may be a self-contained operating environment that emulates a Java virtual machine and executes Java byte code for the processor-based system 102.

In one embodiment, and as described in more detail below, the platform-independent interpreter 214 and a platform-independent USB interface 216 cooperatively facilitate communication between the processor-based system 102 and the USB device 106. The platform-independent USB interface 216 may be any one of a variety of platform-independent interfaces, although in the illustrated embodiment, the platform-independent USB interface 216 is a Java-based application program interface (API). One version of a Java-based API is described in an Internet draft entitled "Java API for USB (javax.usb)" dated Apr. 4, 2001, published at <http://jcp.org/jsr/detail/80.jsp>, which is incorporated herein in its entirety. The Java-based API may include one or more classes (i.e., programming tools) for accessing USB devices 106. Classes are typically introduced in Java source code using an "import" keyword. For example, to gain full access to all the classes in the javax.usb API, the statement "import javax.usb.*" may be placed in the Java source code, typically at the beginning of the code.

As mentioned, the platform-independent USB configuration routine 212, in one embodiment, may be a Java-based application. Java is an object-oriented programming language designed to be, among other things, portable over multiple platforms (i.e., operating systems and processors). Typically, language compilers generate binary code for the target computer, which may run at an optimal speed that the particular computer system is capable of supporting. Java, however, typically compiles to a portable byte code for a theoretical machine. In one embodiment, the platform-independent interpreter 214 may be a program that emulates a Java virtual machine for the processor-based system 102, and thereby can execute Java byte code for the processor-based system 102. This means that Java byte code compiled on one type of computer may run on other computers with the platform-independent interpreter 214. It should be noted that the platform-independent USB configuration routine 212 is not limited to Java, and may be written in one of a variety of platform-independent software development tools and languages.

Figure 3:
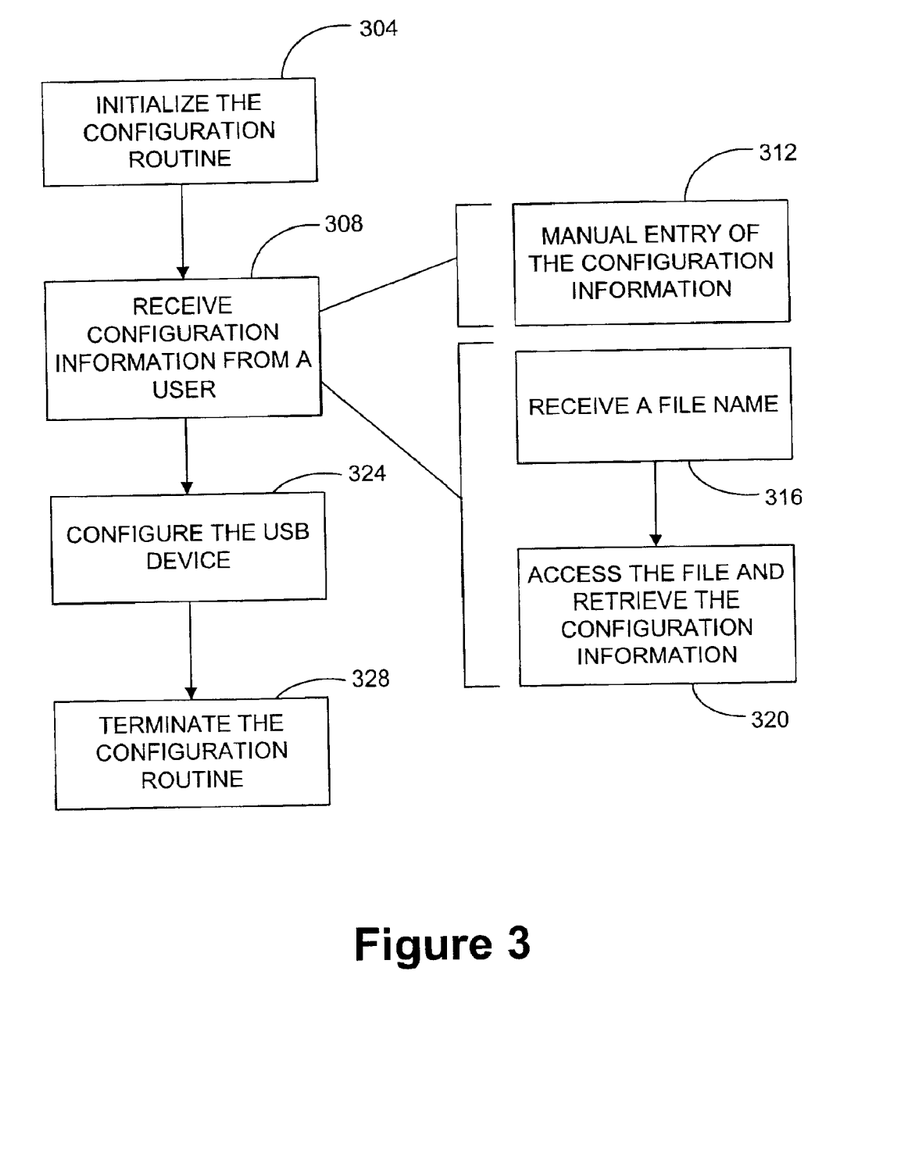
FIG. 3 illustrates a flow diagram of a method that may be implemented on the processor-based system of FIG. 2, in accordance with one embodiment of the present invention.

Turning now to FIG. 3, a flow diagram of one embodiment of a method for configuring the USB device 106 is shown. As utilized herein, the "configuration information" may include data with which the USB device 106 is configured and a memory address location of where the data is to be stored in the USB device 106. In one embodiment, the configuration information defines one or more operating characteristics of the USB device 106, and, as such, may include at least a portion of an operating system, protocol stack, or standard application layer. In one embodiment, the configuration information may be a software upgrade that defines one or more "features" of the USB device 106.

In the illustrated embodiment, the platform-independent USB configuration routine 212 is initialized (at 304). The platform-independent USB configuration routine 212 may be initialized (at 304), for example, when the control unit 206 executes the platform-independent USB configuration routine 212 using the platform-independent interpreter 214 at a request of a user.

Upon initialization (at 304), the USB configuration routine 212 may receive (at 308) configuration information from the user to configure one or more USB devices 106. In one embodiment, the USB configuration routine 212 may receive (at 312) the configuration information manually from the user. That is, the user may manually provide the configuration information, which may then be used to configure the USB device 106. In an alternative embodiment, the USB configuration routine 212 may receive (at 316) at least one file name from the user, where the data file associated with the file name contains the configuration information for configuring the USB device 106.

For ease of illustration, it is herein assumed that a file name is received (at 316) by the USB configuration routine 212. The USB configuration routine 212 may access (at 320) the data file associated with the received file name to retrieve the configuration information from the data file. Accessing (at 320) the data file and retrieving the configuration information may include accessing the data file stored on the storage unit 208 or on another storage medium. The configuration information may be stored in the data file in one of a variety of formats, including an Intel HEX file format (described in greater detail in FIG. 4).

Upon retrieving the configuration information from the data file, the USB configuration routine 212 configures (at 324) the USB device. In one embodiment, configuring (at 324) the USB device 106 may include extracting the configuration information from the data file to configure the USB device 106, as described in more detail below.

The platform-independent USB configuration routine 212 may configure the USB device 106 by storing at least a portion of the extracted configuration information in the internal memory 203 or the external memory 204 of the USB device 106. Once the extracted configuration information is stored in the USB device 106, the USB device 106 may reinitialize and execute the newly received configuration information.

In the illustrated embodiment, the USB configuration routine 212 may be terminated (at 328) in response to configuring (at 324) the USB device 106. The USB configuration routine 212 may be terminated (at 328), for example, when the control unit 206 stops executing the platform-independent USB configuration routine 212 at the request of the user.

Figure 4:
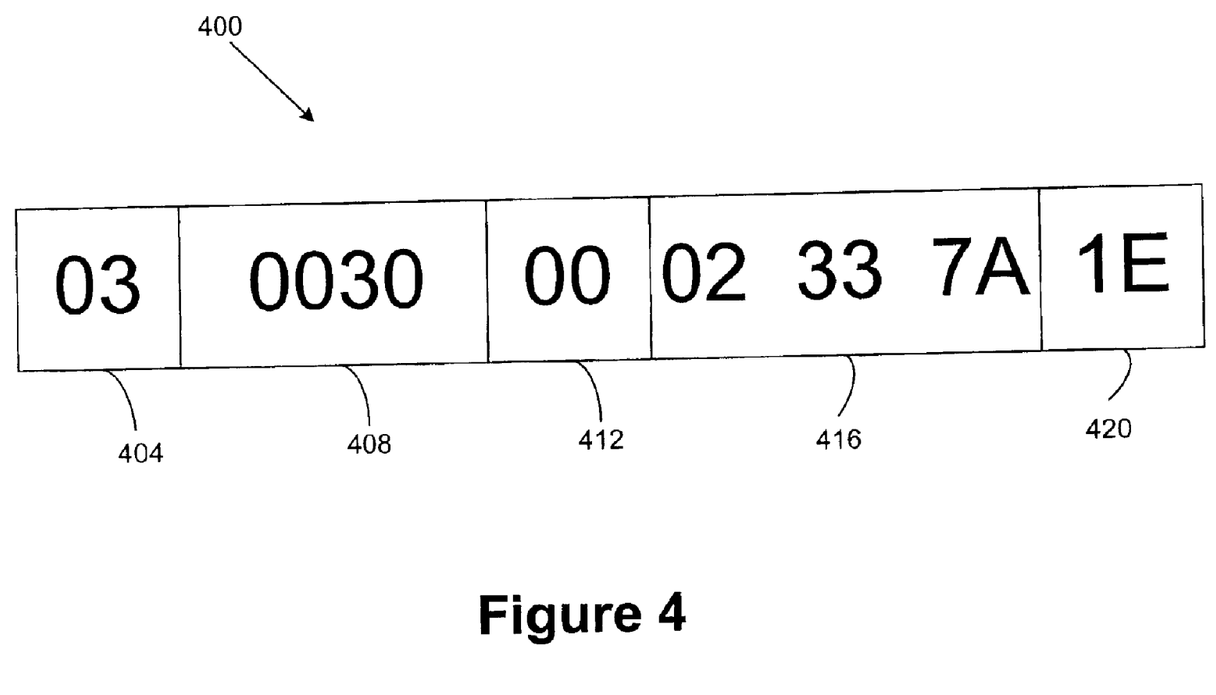
FIG. 4 illustrates one embodiment of a data record that may be utilized by the method of FIG. 3.

FIG. 4 illustrates an exemplary Intel HEX record 400 containing the configuration information that may be stored in a data file, such as an Intel HEX file. The data file, for example, may be an ASCII text file that includes one or more Intel HEX records. In the illustrated embodiment, the Intel HEX record 400 includes five fields: a record length field 404; an address field 408; a record type field 412; a data field 416; and a checksum field 420. The size of the fields 404, 408, 412, 416, and 420 of the record 400 may vary, depending on the implementation.

The record length field 404 indicates the size of the data field 416 of the Intel HEX record 400. Thus, the size of the data field 416 may vary from one record to another, where the record length field 404 of each record 400 reflects the size of the data carried by that record 400. The address field 408 may contain a starting address of where the data is to be stored in the internal memory 203 or the external memory 204 of the USB device 106. The record type field 412 specifies the type of record for that Intel HEX record 400. Examples of Intel HEX record types may include a data record, which typically contains data and a destination address of that data, and an end-of-file (EOF) record, which typically indicates the last line (i.e., record) of the data file.

The data field 416 contains at least a portion of the configuration information that may be used to configure the USB device 106. As utilized herein, the term "configuration information" may include the data stored in the data field 416 and the destination address stored in the address field 408 of the Intel HEX record 400. The checksum field 420 contains a checksum value to be determined if the record 400 is substantially error free. In the illustrated embodiment, the checksum value in the checksum field 420 may be calculated by taking the two's complement of the sum of all the values in fields 404, 408, 412, and 416 of the record 400 modulo 100 h (i.e., 256 in base 10).

Figure 5:
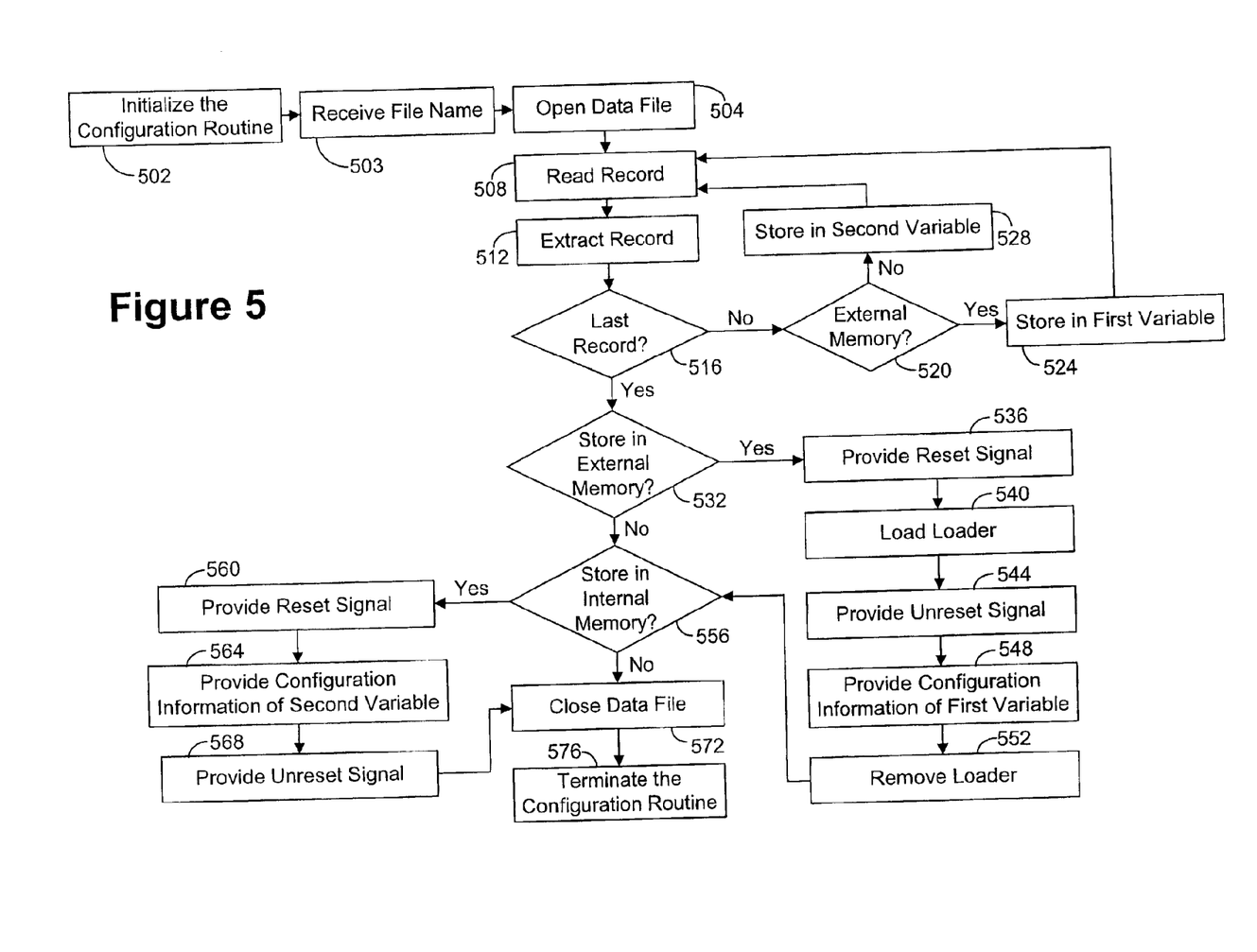
FIG. 5 illustrates an alternative embodiment of the method of FIG. 3 that may be implemented by the processor-based system of FIG. 2, in accordance with the present invention.

Now turning to FIG. 5, a flow diagram of an alternate embodiment of the method of FIG. 3 is shown. In the illustrated embodiment, the USB configuration routine 212 is initialized (at 502). As mentioned, the USB configuration routine 212 may comprise one or more executable instructions for configuring the USB device 106. Upon initialization (at 502), the USB configuration routine 212 receives (at 503) a file name from the user. The received file name may be associated with a data file that contains the configuration information for configuring the USB device 106. The USB configuration routine 212 opens (at 504) the data file corresponding to the received file name. In the illustrated embodiment, although not so limited, the data file is an Intel HEX file that contains one or more Intel HEX records 400 (see FIG. 4). Once the data file is opened (at 504), one or more records 400 may be read (at 508) from the data file. Each line in the data file, for example, may represent one record 400.

In one embodiment, the USB configuration routine 212 extracts (at 512) information from the record length field 404, the address field 408, the record type field 412, the data field 416, and the checksum field 420 of the Intel HEX record. Referring to the exemplary record 400 of FIG. 4, in the USB configuration routine 212 extracts (at 512) information from the record 400 in a manner more fully explained below. The USB configuration routine 212 extracts the first two hexadecimal digits (i.e., "03") of the record length field 404 of the record 400. As mentioned, the first two digits represent the number of data character pairs in the data field 416 of the record 400. For example, as shown in FIG. 4, the data field 416 of the record 400 comprises three character pairs (i.e., "02337A"), which match the record length stored (i.e., three) in the record length field 404 at the record 400.

The next four characters following the record length field 404 are extracted from the address field 408. The address field 408 may include a destination address where the data in the data field 416 is to be stored in the USB device 106.

Based on the destination address stored in the address field, the data in the data field 416 may be stored in either the internal memory 203 or external memory 204 of the USB device 106. For example, when the destination address in the address field 408 is associated with the range of addresses of the internal memory 203, the data in the data field 416 may be stored in the internal memory 203 of the USB device 106. And when the destination address in the address field 408 is associated with the range of addresses of the external memory 204, the data in the data field 416 may be stored in the external memory 204 of the USB device 106. As mentioned, the data from the data field 416 and the address from the address field 408, collectively, may be part of the "configuration information."

The two characters of the record type field 412 may be extracted next. As mentioned, the record type field 412 indicates the type of record 400 that is read (at 508) from the data file. As shown, the "00" characters in the record type field 412 of the record 400 in the illustrated embodiment indicate that this record is a "data record" as opposed to an end-of-file (EOF) record, which is denoted by characters "01" in the record type field 412 of the record 400.

A plurality of characters following the address field 408, excluding the last two characters (i.e., the checksum field 420), may be extracted from the data field 416. As mentioned, the contents of the record length field 404 indicate the length of the data field 416. In the illustrated example, the exemplary record length in the record length field 404 is three.

The last two digits of the record 400 following the address field 416 may be extracted by the USB configuration routine 212 from the checksum field 420. In one embodiment, the value in the checksum field 420 may be utilized to determine whether the record 400 contains an error. The checksum field 420 may be calculated by taking the two's complement of the sum of all the values in fields 404, 408, 412, and 416 of the record 400 modulo 100 h (i.e., 256 in base 10). For example, the sum of the all the values in the fields 404, 408, 412, and 416 of the record 400 is E2 (i.e., 3+2+33+7A=E2). Because E2 is less than 100h, E2 modulo 100 h still yields E2. The two's complement of E2 is 1E (i.e., 100 h−E2=1E). As such, in the illustrated example of FIG. 4, the contents of the checksum field 420 reveals that the record 400 contains no errors.

It should be appreciated that the sequence in which the USB configuration routine 212 extracts (at 512) information from the record 400 may vary from one implementation to another. For example, information from the Intel HEX record 400 may be extracted serially from left to right, or alternatively, out of order. Accordingly, the above-described extraction sequence is exemplary in nature and may be modified in any desirable manner.

The USB configuration routine 212 determines (at 516) whether the last record has been read (at 508) from the data file. In one embodiment, the USB configuration routine 212 may determine (at 516) whether the last record has been read (at 508) based on the contents extracted from the record type field 412 of the record 400. For example, the record type field 412 that represents an EOF record (i.e., as opposed to a data record) may indicate that the last record has been read (at 508) from the data file.

If the last record has not been read (at 516) from the data file, the USB configuration routine 212 may determine (at 520) whether the destination address stored in the address field 408 indicates the data in the data field 416 is to be stored in the internal memory 203 or external memory 204 of the USB device 106. As mentioned, when the destination address stored in the address field 408 is associated with the range of addresses of the internal memory 203, the data stored in the data field 416 may be stored in the internal memory 203 of the USB device 106. And when the destination address stored in the address field 408 is associated with the range of addresses of the external memory 204, the data stored in the data field 416 may be stored in the external memory 204 of the USB device 106.

If the destination address in the address field 408 is within the range of addresses associated with the external memory 204, the USB configuration routine 212 stores (at 524) the configuration information in a first variable. As mentioned, the term "configuration information" may include the data stored in the data field 416 and its associated destination address stored in the address field 408 of the record 400. When the destination address in the address field 408 is within the range of addresses associated with the internal memory 203, the USB configuration routine 212 stores (at 528) the configuration information in a second variable. The first and second variables, for example, may be any abstract data type, such as an array, record, linked list, or the like, which is capable of storing (at 524, 528) the configuration information.

The USB configuration routine 212 determines (at 532) whether at least a portion of the configuration information extracted (at 512) from the data file is to be stored in the external memory 204 of the USB device 106. In the illustrated embodiment, the USB configuration routine 212 may determine whether at least a portion of the extracted configuration information is to be stored in the external memory 204 of the USB device 106 by determining (at 532) if the first variable is empty. An empty first variable in the illustrated embodiment is an indication that the data file contains no configuration information for storage in the external memory 204 of the USB device 106.

If the USB configuration routine 212 determines (at 532) that it is desirable to store at least a portion of the extracted configuration information in the external memory 204, then the USB configuration routine 212 configures the USB device 106 in a manner described more fully below. The USB configuration routine 212 provides (at 536) a reset signal to the USB device 106. In one embodiment, the reset signal, once received, suspends the execution of the existing configuration information in the USB device 106. Alternatively, the reset signal, once received, places the USB device 106 in a state to receive new configuration information. The USB configuration routine 212, through the platform-independent USB interface 216, loads (at 540) a loader to the internal memory 203 of the USB device 106. The loader, for example, may be a program that provides the configuration information stored in the first variable to the external memory 204 of the USB device 106. Furthermore, the loader may be capable of being executed by the USB device 106 when the USB device 106 is in an "unreset state" (described below).

After the USB configuration routine 212 loads (at 540) the loader, the USB configuration routine 212 provides (at 544) an unreset signal to the USB device 106 to place the USB device 106 in an "unreset state." In one embodiment, the USB device 106, when in the unreset state, executes the loader, which then provides (at 548) the configuration information stored in the first variable to the external memory 204 of the USB device 106.

The USB configuration routine 212 removes (at 552) the loader from the internal memory 203 of the USB device 106.

In one embodiment, to remove (at 552) the loader, the USB configuration routine 212 may provide a reset signal, which, when received by the USB device 106, suspends the execution of the configuration information in the USB device 106 and places the USB device 106 in a "reset state" at which time the USB configuration routine 212 can delete the loader from the internal memory 203. The loader may be deleted, for example, by overwriting it with the configuration information stored in the second variable, as described in more detail below. Alternatively, a delete command, if available, may be issued to delete the loader from the internal memory 203 of the USB device 106. In one embodiment, the step of removing (at 552) the loader may include providing an unreset signal to the USB device 106 to place it in an "unreset state."

It should be appreciated that the sequence in which the configuration information is uploaded to the external memory 204 of the USB device 106 may vary from one implementation to the other. For example, uploading the configuration information to the external memory 204 of the USB device 106 may be accomplished without the assistance of the loader (i.e., the USB configuration routine 212 may directly copy the configuration information to the external memory 204). In another embodiment, the USB configuration routine 212 may terminate the execution of the loader without removing (at 552) the loader from the internal memory 203 of the USB device 106. Thus, the above-described uploading sequence is exemplary in nature and may be modified in any desirable manner.

The USB configuration routine 212 determines (at 556) whether at least a portion of the configuration information extracted (at 512) from the data file is intended to be stored in the internal memory 203 of the USB device 106. In the illustrated embodiment, the USB configuration routine 212 may determine whether at least a portion of the extracted configuration information is intended to be stored in the internal memory 203 of the USB device 106 by determining (at 556) if the second variable is empty. An empty second variable in the illustrated embodiment is an indication that the data file contained no configuration information for storage in the internal memory 203 of the USB device 106.

If the USB configuration routine 212 determines (at 556) that it is desirable to store at least a portion of the extracted configuration information in the internal memory 203, then the USB configuration routine 212 configures the USB device 106 in a manner more fully described below. To transmit the configuration information stored in the second variable to the internal memory 203, the USB configuration routine 212 provides (at 560) a reset signal, which, when received by the USB device 106, suspends the execution of the existing configuration information in the USB device 106 and places the USB device 106 in a state to receive new configuration information. The USB configuration routine 212, through the platform-independent USB interface 216, provides (at 564) the configuration information stored in the second variable to the internal memory 203 of the USB device 106. The USB configuration 212 provides (at 568) an unreset signal to the USB device 106 to place the USB device 106 in an "unreset state." In one embodiment, the USB device 106, when placed in an unreset state, executes the configuration information provided (at 564) by the USB configuration routine 212.

The USB configuration routine 212 closes (at 572) the data file that was opened (at 504. The USB configuration routine 212 may be terminated (at 576) once the USB device 106 has been configured using the configuration information from the data file.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An article comprising one or more machine-readable storage media containing instructions that when executed enable a processor to:

access a data file;

receive data and an associated destination address from the data file;

receive an address indicating a memory location in at least one of an internal memory and an external memory of a Universal Serial Bus (USB) device; and store the data at the memory location indicated by the destination address in the USB device through a platform-independent interface.

2. The article of claim 1, wherein the instructions when executed enable the processor to store the data in the internal memory if the received address falls within an address range associated with the internal memory.

3. The article of claim 2, wherein the instructions when executed enable the processor to provide a reset signal to the USB device, transmit at least the portion of the data to the associated destination address in the USB device, and provide an unreset signal to the USB device.

4. The article of claim 1, wherein the instructions when executed enable the processor to store the data in the external memory if the received address falls within an address range associated with the external memory.

5. The article of claim 4, wherein the instructions when executed enable the processor to provide a reset signal to the USB device, transmit an executable program to the USB device, and provide an unreset signal to the USB device.

6. The article of claim 5, wherein the instructions when executed enable the processor to cause the executable program to be executed in response to providing the unreset signal, wherein, the executable program enables data to be stored in the external memory.

7. The article of claim 5, wherein the instructions when executed enable the processor to remove the executable program from the USB device.

8. An apparatus, comprising:

a storage unit adapted to store a platform-independent routine and a platform independent interface; and a control unit adapted to execute the platform-independent routine, wherein the platform-independent routine causes the control unit to receive configuration information, and configure a Universal Serial Bus (USB) device through the platform-independent interface by storing at least a portion of the configuration information in at least one of an internal memory and an external memory of the Universal Serial Bus (USB) device.

9. The apparatus of claim 8, wherein the platform-independent routine is Java-based application.

10. The apparatus of claim 8, wherein the control unit further uploads a loader to the internal memory of the USB device.

11. An apparatus, comprising:
a platform-independent USB interface adapted to interface with one or more Universal Serial Bus (USB) devices;
a storage unit adapted to store a platform-independent configuration routine; and
a platform-independent interpreter adapted to execute the platform-independent routine and to cause configuration information to be stored in at least one of an internal memory and an external memory of the one or more USB devices through the platform-independant USB interface.

12. The apparatus of claim 11, wherein the storage unit is adapted to store a Java based executable program.

13. The apparatus of claim 11, wherein the platform-independent interface comprises a Java-based application program interface (API).

14. The apparatus of claim 11, wherein the platform-independent interpreter is a Java interpreter.

15. A method, comprising:
receiving configuration information;
providing at least a portion of the configuration information from a platform-independant routine to a universal serial bus (USB) device through a platform-independent interface; and
providing a reset signal to the USB device, transmitting at least the portion of the configuration information to the USB device, and providing an unreset signal to the USB device.

16. The method of claim 15, wherein receiving the configuration information comprises receiving the configuration information as a manual input from a user.

17. The method of claim 15, wherein receiving the configuration information comprises receiving a file name, accessing a file associated with the file name, and retrieving the configuration information from the file.

* * * * *